United States Patent
Kitawaki et al.

(10) Patent No.: US 12,087,342 B2
(45) Date of Patent: Sep. 10, 2024

(54) ALUMINUM ALLOY DISC BLANK FOR MAGNETIC DISC AND MAGNETIC DISC

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Ryo Sakamoto, Tokyo (JP); Wataru Kumagai, Tokyo (JP); Hideyuki Hatakeyama, Tokyo (JP); Ryohei Yamada, Tokyo (JP); Shinpei Todo, Tokyo (JP); Toshihiro Nakamura, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/339,994

(22) Filed: Jun. 22, 2023

(65) Prior Publication Data

US 2023/0335161 A1    Oct. 19, 2023

Related U.S. Application Data

(63) Continuation of application No. PCT/JP2021/047225, filed on Dec. 21, 2021.

(30) Foreign Application Priority Data

Dec. 24, 2020    (JP) ................. 2020-215207

(51) Int. Cl.
| | | |
|---|---|---|
| G11B 5/73 | (2006.01) | |
| G11B 5/84 | (2006.01) | |
| G11B 5/858 | (2006.01) | |

(52) U.S. Cl.
CPC ........ *G11B 5/73919* (2019.05); *G11B 5/8404* (2013.01); *G11B 5/858* (2013.01)

(58) Field of Classification Search
None
See application file for complete search history.

(56) References Cited

U.S. PATENT DOCUMENTS

| | | | | |
|---|---|---|---|---|
| 11,211,088 B2 * | 12/2021 | Murata | ............... | C23C 18/1803 |
| 2018/0221928 A1 * | 8/2018 | Kitawaki | ............... | B22D 1/002 |
| 2020/0365180 A1 * | 11/2020 | Kitawaki | ................. | G11B 5/82 |

FOREIGN PATENT DOCUMENTS

| | | |
|---|---|---|
| JP | H108177 A | 1/1998 |
| JP | 2013-151737 A | 8/2013 |
| JP | 2019-160384 A | 9/2019 |

(Continued)

OTHER PUBLICATIONS

Abstract for WO 2017/188320 A1 (Year: 2017).*

(Continued)

*Primary Examiner* — Kevin M Bernatz
(74) *Attorney, Agent, or Firm* — Ruggiero McAllister and McMahon LLC

(57) ABSTRACT

An aluminum alloy disc blank for a magnetic disc made of an aluminum alloy containing Fe: 0.005 to 1.800 mass % with the balance being Al and inevitable impurities, wherein a flatness change of the aluminum alloy disc blank for a magnetic disc when the aluminum alloy disc blank for a magnetic disc is held in the atmosphere at 50° C. or lower for 336 hours is 2.0 μm or less.

8 Claims, 1 Drawing Sheet

(56) References Cited

FOREIGN PATENT DOCUMENTS

JP          2020-029595 A       2/2020
WO     WO-2017188320 A1 *  11/2017   ............. C22C 21/00

OTHER PUBLICATIONS

International Search Report dated Mar. 15, 2022 from corresponding International Patent Application No. PCT/JP2021/047225, 11 pages.
Written Opinion dated Mar. 15, 2022 from corresponding International Patent Application No. PCT/JP2021/047225, 6 pages.
International Preliminary Report on Patentability dated Jul. 6, 2023 from corresponding International Patent Application No. PCT/JP2021/047225, 9 pages.
Japanese Decision to Grant dated Oct. 27, 2021 from corresponding Japanese Patent Application No. 2020-215207, 6 pages.

* cited by examiner

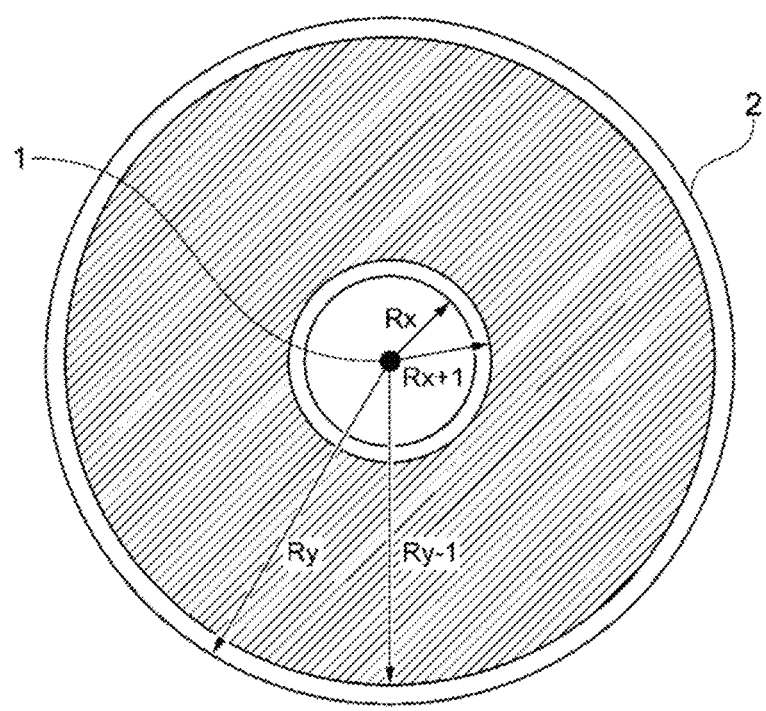

ALUMINUM ALLOY DISC BLANK FOR MAGNETIC DISC AND MAGNETIC DISC

CROSS REFERENCE TO RELATED APPLICATIONS

The present application is a continuation application of International Patent Application No. PCT/JP2021/047225 filed on Dec. 21, 2021, which claims the benefit of Japanese Patent Application No. 2020-215207, filed on Dec. 24, 2020. The contents of these applications are incorporated herein by reference in their entirety.

TECHNICAL FIELD

The present disclosure relates to an aluminum alloy disc blank for a magnetic disc, and to a magnetic disc.

DESCRIPTION OF THE RELATED ART

A hard disc drive (hereinafter, abbreviated as "HDD") is often used as a storage device in electronic equipment such as computers and video-recording devices. A magnetic disc for recording data is incorporated into the HDD. The magnetic disc has an aluminum alloy substrate made of an aluminum alloy and having an annular shape, a Ni—P plated layer that covers the surface of the aluminum alloy substrate and a magnetic body layer stacked on the Ni—P plated layer.

In recent years, the amount of information that is recorded in HDDs has been increasing in applications for both industrial uses such as servers or data centers and household uses such as personal computers or video-recording devices. In order to increase the capacity of HDDs in response to such a condition, an increase in the recording density of the magnetic discs that are incorporated into the HDDs is in demand. In order to increase the recording density of a magnetic disc, a smooth Ni—P plated layer is formed on the aluminum alloy substrate.

The magnetic disc is normally produced by the following method. First, a rolled plate of an aluminum alloy is blanked in an annular shape to produce a disc blank. Next, the disc blank is heated while being pressed from both sides in the thickness direction to decrease warpage of the disc blank. After that, cutting and grinding are performed on the disc blank for shaping into a desired shape, whereby an aluminum alloy substrate is obtained. On the aluminum alloy substrate obtained as described above, a pretreatment for forming a Ni—P plated layer, electroless Ni—P plating and the sputtering of a magnetic body layer are sequentially performed, whereby a magnetic disc can be produced.

As the aluminum alloy that is used for the aluminum alloy substrate, a JIS A 5086 alloy is often used.

For magnetic discs, an increase in the capacity and an increase in the density are in demand due to needs from multimedia and the like. In order for an additional increase in the capacity, a method in which the thickness of a magnetic disc is reduced to increase the number of on-board discs has been adopted. In this method, stiffness decreases in association with thickness reduction, and disc flutter is likely to occur. This arises from the fact that, when magnetic discs are rotated at a high speed, an unstable air flow is generated between the discs, and the vibration of the magnetic discs (fluttering) occurs due to the air flow. When fluttering occurs, the positioning error of a head, which is a reading unit, increases. Therefore, as a fluttering countermeasure, a method in which helium is loaded into a hard disc to decrease the fluid force has been adopted. This is because the gas viscosity of helium is as small as approximately ⅛ of that of the air. Fluttering that occurs due to the flow of gas in association with the rotation of the hard disc is reduced by decreasing the fluid force of the gas. However, it was necessary to seal helium, and thus there was a problem in that the cost increased. Incidentally, in a case where the inside of the hard disc is the atmosphere, there is a tendency that the floating height of the head during reading and writing is decreased for an additional increase in the capacity; however, when a protruding defect is present on the surface of the magnetic disc, the protruding defect collides with the magnetic head and causes a recording error, and thus reduction of the protruding defect is demanded.

Therefore, for the purpose of further improving smoothness by reducing protruding defects, a technique for reducing a foreign matter in the aluminum alloy substrate, such as an intermetallic compound, is being studied in a variety of manners. For example, in Japanese Patent Application Publication No. H10-008177, a method for reducing a $Mg_2Si$ compound or an Al—Fe-based compound in an aluminum alloy sheet for a magnetic disc substrate containing 2.0 to 6.0 wt % of Mg, 0.05 to 0.15 wt % of Cu, 0.10 to 0.30 wt % of Zn, 0.05 to 0.12 wt % of Zr and 0.2 wt % or less (including 0 wt %) of Sn with the contents of Cu, Zn, Zr and Sn satisfying a relational formula of 0.15 wt %≤2Cu+6Zr—3Zn—0.1Sn≤0.32 wt % (Cu, Zr, Zn and Sn in the formula are each wt %) and further containing one or two of more than 0.01 wt % and less than 0.05 wt % of Mn and more than 0.01 wt % and less than 0.05 wt % of Cr with the balance being inevitable impurities elements and Al is described.

Summary of Disclosure

Technical Problem

According to the method of Japanese Patent Application Publication No. H10-008177, it is possible to increase the cooling rate during the solidification of molten metal to miniaturize an intermetallic compound by twin roll-type continuous casting. However, in the method of Japanese Patent Application Publication No. H10-008177, there is a problem in that it is difficult to reduce a protruding defect of disc blank attributed to a cause other than the intermetallic compound.

The present disclosure has been made in consideration of the above-described problem, and the present inventors found that an aluminum alloy disc blank for a magnetic disc having excellent smoothness can be obtained by controlling the flatness change of the aluminum alloy disc blank for a magnetic disc and completed the present disclosure.

Solution to Problem

An aspect of the present disclosure is an aluminum alloy disc blank for a magnetic disc made of an aluminum alloy containing Fe: 0.005 to 1.800 mass % with a balance being Al and inevitable impurities, wherein a flatness change of the aluminum alloy disc blank for a magnetic disc when the aluminum alloy disc blank for a magnetic disc is held in an atmosphere at 50° C. or lower for 336 hours is 2.0 μm or less.

Another aspect of the present disclosure is the aluminum alloy disc blank for a magnetic disc, wherein the aluminum alloy further contains one or two or more elements selected from the group consisting of Mn: 1.80 mass % or less, Ni: 2.50 mass % or less, Cu: 1.00 mass % or less, Zn: 0.70 mass % or less, Mg: 4.50 mass % or less, Cr: 0.30 mass % or less, Zr: 0.15 mass % or less, Si: 14.00 mass % or less, Be: 0.0015 mass % or less, Sr: 0.10 mass % or less, Na: 0.10 mass % or less and P: 0.10 mass % or less.

Still another aspect of the present disclosure is the aluminum alloy disc blank for a magnetic disc, wherein a crystal grain diameter on a surface of the aluminum alloy disc blank for a magnetic disc is 18 μm or less.

Still another aspect of the present disclosure is the aluminum alloy disc blank for a magnetic disc, wherein a crystal grain diameter on a surface of the aluminum alloy disc blank for a magnetic disc is 15 μm or less.

Still another aspect of the present disclosure is the aluminum alloy disc blank for a magnetic disc, wherein a crystal grain diameter on a surface of the aluminum alloy disc blank for a magnetic disc is 12 μm or less.

Still another aspect of the present disclosure is the aluminum alloy disc blank for a magnetic disc, wherein a crystal grain diameter on a surface of the aluminum alloy disc blank for a magnetic disc is 11 μm or less.

Still another aspect of the present disclosure is the aluminum alloy disc blank for a magnetic disc, wherein a crystal grain diameter on a surface of the aluminum alloy disc blank for a magnetic disc is 10 μm or less.

Still another aspect of the present disclosure is a magnetic disc, including: on a surface of an aluminum alloy substrate made of the aluminum alloy disc blank for a magnetic disc, a Ni—P plated layer; and a magnetic body layer on the Ni—P plated layer.

Effects of Disclosure

The aluminum alloy disc blank for a magnetic disc according to the present disclosure is capable of increasing smoothness by controlling the flatness change.

BRIEF DESCRIPTION OF DRAWING

FIG. 1 is a diagram showing a measurement range of flatness of an aluminum alloy disc blank.

DESCRIPTION OF EMBODIMENTS

A. Aluminum Alloy Disc Blank for Magnetic Disc

An aluminum alloy disc blank for a magnetic disc according to the present disclosure (hereinafter, referred to as "aluminum alloy disc blank" in some cases) will be described. The aluminum alloy disc blank can be obtained by producing an aluminum alloy sheet using an aluminum alloy having a predetermined alloy composition and blanking this in a disc shape. The aluminum alloy disc blank is made of an aluminum alloy containing Fe: 0.005 to 1.800 mass % with the balance being Al and inevitable impurities. The flatness change of the aluminum alloy disc blank when the aluminum alloy disc blank is held in the atmosphere at 50° C. or lower for 336 hours is 2.0 μm or less. The flatness change is calculated as an absolute value of {(flatness of aluminum alloy disc blank before being held at 50° C. or lower for 336 hours)–(flatness of aluminum alloy disc blank after being held at 50° C. or lower for 336 hours)}. When this flatness change is 2.0 μm or less, residual stress is less likely to be generated at the time of the surface cutting or grinding of the aluminum alloy disc blank, and a protruding defect is less likely to be generated in annealing that is performed after processing. As a result, it is possible to prevent the generation of a protruding defect on a magnetic disc surface by improving the smoothness of the aluminum alloy disc blank.

A-1. Alloy Composition of Aluminum Alloy

The composition of the aluminum alloy that is used for the aluminum alloy disc blank and reasons for limiting that will be described below in detail.

Fe: 0.005 to 1.800 mass %

Fe is present mainly as second phase particles (Al—Fe-based intermetallic compound or the like), and some is present as a solid solution in the matrix. Fe exhibits an effect of improving the strength and stiffness of the aluminum alloy disc blank by the second phase particle generation and the formation of the solid solution in the matrix. However, when the content of Fe is less than 0.005 mass %, the strength of the aluminum alloy disc blank is too low, and thus the aluminum alloy disc blank deforms at the time of peeling the disc blank after press annealing. On the other hand, when the content of Fe exceeds 1.800 mass %, a coarse intermetallic compound is generated, during the etching, during the zincate treatment or during the cutting or grinding of the aluminum alloy disc blank, the intermetallic compound drops to generate large dents, and the smoothness of the surface deteriorates. In addition, when the content of Fe is large, the strength of the aluminum alloy disc blank becomes high, and thus cracking occurs during rolling. Therefore, the content of Fe in the aluminum alloy is set to 0.005 to 1.800 mass %. The content of Fe is preferably set to 0.010 to 1.500 mass % from the viewpoint of the balance among the strength, stiffness and manufacturability of the aluminum alloy disc blank.

In the aluminum alloy disc blank of one embodiment, in addition to Fe, furthermore, one or two or more elements of Mn (manganese), Ni (nickel), Cu (copper), Zn (zinc), Si (silicon), Be (beryllium), Cr (chromium), Zr (zirconium), Mg (magnesium), Sr (strontium), Na (sodium) and P (phosphorus) may be contained as arbitrary components. In this case, it is possible to obtain an aluminum alloy disc blank for a magnetic disc made of an aluminum alloy containing Fe: 0.005 to 1.800 mass % and containing one or two or more elements selected from the group consisting of Mn: 1.80 mass % or less, Ni: 2.50 mass % or less, Cu: 1.00 mass % or less, Zn: 0.70 mass % or less, Mg: 4.50 mass % or less, Cr: 0.30 mass % or less, Zr: 0.15 mass % or less, Si: 14.00 mass % or less, Be: 0.0015 mass % or less, Sr: 0.10 mass % or less, Na: 0.10 mass % or less and P: 0.10 mass % or less, with the balance being Al and inevitable impurities, wherein the flatness change of the aluminum alloy disc blank for a magnetic disc when the aluminum alloy disc blank for a magnetic disc is held in the atmosphere at 50° C. or lower for 336 hours is 2.0 μm or less.

Hereinafter, each arbitrary component will be described in detail.

Mn: 1.80 mass % or less

In the aluminum alloy disc blank, 1.80 mass % or less of Mn may be contained as an arbitrary component. Mn is present mainly as second phase particles (Al—Mn-based intermetallic compound or the like), and some is present as a solid solution in the matrix. Mn exhibits an effect of improving the strength and stiffness of the aluminum alloy disc blank by the second phase particle generation and the formation of the solid solution in the matrix. However, when the content of Mn is large, there is a concern that a coarse intermetallic compound may be generated, during the etching, during the zincate treatment or during the cutting or grinding of the aluminum alloy disc blank, the intermetallic compound may drop to generate large dents and the smoothness of the surface may deteriorate. In addition, when the content of Mn is large, there is a concern that the strength of the aluminum alloy disc blank may become high and thus cracking may occur during rolling. Therefore, the content of Mn is preferably set to 1.80 mass % or less. The content of Mn is preferably set to 0.01 to 1.50 mass % from the viewpoint of the balance among the strength, stiffness and manufacturability of the aluminum alloy disc blank.

Ni: 2.50 mass % or less

In the aluminum alloy, 2.50 mass % or less of Ni may be contained as an arbitrary component. Ni is present mainly as second phase particles (Al—Ni-based intermetallic compound or the like), and some is present as a solid solution in the matrix. Ni exhibits an effect of improving the strength and stiffness of the aluminum alloy disc blank by the second phase particle generation and the formation of the solid solution in the matrix. However, when the content of Ni is large, there is a concern that a coarse intermetallic compound may be generated, during the etching, during the zincate treatment or during the cutting or grinding of the aluminum alloy disc blank, the intermetallic compound may drop to generate large dents and the smoothness of the surface may deteriorate. In addition, when the content of Ni is large, there is a concern that the strength of the aluminum alloy disc blank may become high and thus cracking may occur during rolling. Therefore, the content of Ni is preferably set to 2.50 mass % or less. The content of Ni is preferably set to 0.01 to 2.00 mass % from the viewpoint of the balance among the strength, stiffness and manufacturability of the aluminum alloy disc blank.

Cu: 1.00 mass % or less

In the aluminum alloy, 1.00 mass % or less of Cu may be contained as an arbitrary component. Cu is present mainly as second phase particles (Al—Cu-based intermetallic compound or the like) and exhibits an effect of improving the strength and Young's modulus of the aluminum alloy disc blank. In addition, the amount of Al dissolved during the zincate treatment of the aluminum alloy disc blank is decreased. Furthermore, Cu uniformly, thinly and densely have a zincate coating attach to the aluminum alloy substrate during the zincate treatment and exhibits an effect of improving the smoothness in a plating step that is a subsequent step.

However, when content of Cu becomes large, the corrosion resistance of the aluminum alloy disc blank deteriorates, and a region where Al is likely to elute is locally formed. Therefore, when the zincate treatment has been performed in the manufacturing process of a magnetic disc, unevenness is caused in the amount of Al dissolved on the surface of an aluminum alloy substrate, and a variation in the thickness of a Zn coating is likely to become large. As a result, there is a concern that the deterioration of the tight contact property between a Ni—P plated layer and the aluminum alloy substrate or the deterioration of the smoothness of the Ni—P plated layer may result.

When the content of Cu in the aluminum alloy is preferably set to 1.00 mass % or less and more preferably set to 0.50 mass % or less, it is possible to further increase the stiffness and strength of the aluminum alloy disc blank, to inhibit the formation of a plating pit and to further enhance the smoothness of the Ni—P plated layer. The lower limit of the content of Cu is preferably 0.005 mass %.

Zn: 0.70 mass % or less

In the aluminum alloy, 0.70 mass % or less of Zn may be contained as an arbitrary component. Zn decreases the amount of Al dissolved during the zincate treatment of the aluminum alloy disc blank, additionally, uniformly, thinly and densely have a zincate coating attach to the aluminum alloy substrate during the zincate treatment and exhibits an effect of improving the smoothness and the tight contact property in the plating step that is the subsequent step. In addition, Zn forms second phase particles with other additive elements and exhibits an effect of improving the Young's modulus and the strength.

However, when content of Zn becomes large, the corrosion resistance of the aluminum alloy disc blank deteriorates, and a region where Al is likely to elute is locally formed in the aluminum alloy disc blank. Therefore, when the zincate treatment has been performed in the manufacturing process of a magnetic disc, unevenness is caused in the amount of Al dissolved on the surface of an aluminum alloy substrate, and a variation in the thickness of the Zn coating is likely to become large. As a result, there is a concern that the deterioration of the tight contact property between a Ni—P plated layer and the aluminum alloy substrate or the deterioration of the smoothness of the Ni—P plated layer may result.

When the content of Zn in the aluminum alloy is preferably set to 0.70 mass % or less and more preferably set to 0.50 mass % or less, it is possible to further increase the stiffness and strength of the aluminum alloy disc blank, to inhibit the formation of a plating pit and to further enhance the smoothness of the Ni—P plated layer. The lower limit of the content of Zn is preferably 0.10 mass %.

Mg: 4.50 mass % or less

In the aluminum alloy, 4.50 mass % or less of Mg may be contained as an arbitrary component. Mg is present as a solid solution mainly in the matrix, and some is present as second phase particles (Mg—Si-based intermetallic compound or the like). Therefore, Mg exhibits an effect of improving the strength and stiffness of the aluminum alloy disc blank.

However, when the content of Mg becomes large, a coarse Al—Mg-based intermetallic compound is generated, during the etching, during the zincate treatment or during the cutting or grinding of the aluminum alloy disc blank, the intermetallic compound drops to generate large dents, and the smoothness of the surface deteriorates. In addition, when the Mg amount is large, since the strength becomes high, cracking occurs during rolling.

When the content of Mg in the aluminum alloy is preferably set to 4.50 mass % or less, more preferably set to 3.50 mass % or less and still more preferably set to 3.00 mass % or less, it is possible to further increase the strength and stiffness of the aluminum alloy disc blank. The lower limit of the content of Mg is preferably 1.00 mass %.

Cr: 0.30 mass % or less

In the aluminum alloy, 0.30 mass % or less of Cr may be contained as an arbitrary component. Some of Cr disperses in the aluminum alloy as a fine intermetallic compound that is generated during casting and improves the stiffness of the aluminum alloy disc blank. Cr that has not turned into an intermetallic compound during the casting of the aluminum alloy forms a solid solution in the Al matrix and has an action of improving the strength of the aluminum alloy disc blank by solid solution hardening.

In addition, Cr is capable of further enhancing the cutting property and grinding property of the aluminum alloy disc blank and further refining the recrystallized structure. As a result, the tight contact property between the aluminum alloy substrate and the Ni—P plated layer is further enhanced, and it is possible to inhibit the generation of a plating pit.

However, when the content of Cr in the aluminum alloy becomes excessively large, a coarse Al—Cr-based intermetallic compound is likely to be formed in the aluminum alloy disc blank. In a case where such a coarse Al—Cr-based intermetallic compound has dropped from the surface of the aluminum alloy disc blank, in an electroless Ni—P plating that is performed later, a plating pit is likely to be formed.

When the content of Cr in the aluminum alloy is set to 0.30 mass % or less, the stiffness and strength of the aluminum alloy disc blank can be further improved. In addition, it is possible to more effectively inhibit the generation of a plating pit and to further enhance the smoothness of the Ni—P plated layer. The lower limit value of the content of Cr is preferably 0.030 mass %.

Zr: 0.15 mass % or less

In the aluminum alloy, 0.15 mass % or less of Zr may be contained as an arbitrary component. Some of Zr disperses in the aluminum alloy disc blank as a fine intermetallic compound that is generated during the casting of the aluminum alloy and improves the stiffness. Zr that has not turned into an intermetallic compound during the casting of the aluminum alloy forms a solid solution in the Al matrix and has an action of improving the strength of the aluminum alloy disc blank by solid solution hardening.

In addition, Zr is capable of further enhancing the cutting property and grinding property of the aluminum alloy disc blank and further refining the recrystallized structure. As a result, the tight contact property between the aluminum alloy substrate and the Ni—P plated layer is further enhanced, and it is possible to inhibit the generation of a plating pit.

However, when the content of Zr in the aluminum alloy becomes excessively large, a coarse Al—Zr-based intermetallic compound is likely to be formed in the aluminum alloy disc blank. In a case where such a coarse Al—Zr-based intermetallic compound has dropped from the surface of the aluminum alloy disc blank, in the electroless Ni—P plating that is performed later, there are cases where a plating pit is likely to be formed.

When the content of Zr in the aluminum alloy is set to 0.15 mass % or less, it is possible to inhibit the formation of a plating pit, to form a smooth Ni—P plated layer and to further improve the stiffness and strength of the aluminum alloy disc blank. The lower limit value of the content of Zr is preferably 0.050 mass %.

Si: 14.00 mass % or less

In the aluminum alloy, 14.00 mass % or less of Si may be contained as an arbitrary component. Si is present mainly as second phase particles (Si particles, Al—Fe—Si-based intermetallic compound or the like) and exhibits an effect of improving the stiffness and strength of the aluminum alloy disc blank.

However, when the content of Si in the aluminum alloy becomes excessively large, coarse particles or an intermetallic compound is likely to be formed in the aluminum alloy disc blank. In a case where such coarse particles or intermetallic compound has dropped from the surface of the aluminum alloy disc blank, in the electroless Ni—P plating that is performed later, there are cases where a plating pit is likely to be formed.

When the content of Si in the aluminum alloy is set to 14.00 mass % or less, the stiffness and strength of the aluminum alloy disc blank can be further improved. The lower limit value of the content of Si is preferably 0.10 mass %.

Be: 0.0015 mass % or less

Be is an element that is added to molten metal for the purpose of inhibiting the oxidation of Mg at the time of casting an aluminum alloy containing Mg. In addition, when 0.0015 mass % or less of Be is contained in the aluminum alloy, it is possible to make a Zn coating that is formed on the surface of the aluminum alloy substrate in the manufacturing process of a magnetic disc denser and to further decrease the variation in the thickness. As a result, it is possible to further enhance the smoothness of a Ni—P plated layer that is formed on the aluminum alloy substrate.

However, when the content of Be in the aluminum alloy becomes excessively large, a Be-based oxide is likely to be formed on the surface of a disc blank when the disc blank has been heated in the manufacturing process of the aluminum alloy disc blank. In addition, in a case where the aluminum alloy further contains Mg, an Al—Mg—Be-based oxide is likely to be formed on the surface of the disc blank when the aluminum alloy disc blank has been heated. When the amount of this oxide becomes large, the variation in the thickness of the Zn coating becomes large, and there is a concern that the generation of a plating pit may result.

When the content of Be in the aluminum alloy is preferably set to 0.0015 mass % or less and more preferably set to 0.0010 mass % or less, it is possible to reduce the amount of an Al—Mg—Be-based oxide and to further enhance the smoothness of the Ni—P plated layer.

Sr, Na and P: 0.10 mass % or less

When the aluminum alloy contains Sr, Na and P, an effect of refining second phase particles (mainly Si particles) in the aluminum alloy disc blank and improving the plating property is obtained. In addition, there is an effect of decreasing the unevenness in the sizes of the second phase particles in the aluminum alloy disc blank and reducing the variation in the impact resistance in the aluminum alloy disc blank. Therefore, to the aluminum alloy, one or two or more elements selected from the group consisting of preferably 0.10 mass % or less of Sr, preferably 0.10 mass % or less of Na and preferably 0.10 mass % or less of P may be selectively added. However, even when more than 0.10 mass % of each of Sr, Na and P is contained, the effect is saturated, and a more significant improvement effect cannot be obtained. In addition, in order to obtain the above-described effect, it is more preferable that each of Sr, Na and P is 0.001 mass % or more.

Other Elements

In the aluminum alloy, elements that become inevitable impurities other than the above-described essential component and arbitrary components may be contained. Examples of these elements include Ti, B, Si, Ga and the like, and, as long as the content of each element is 0.05 mass % or less and the total content is 0.15 mass % or less, effects of the present disclosure are not impaired. As described above, in the present disclosure, it is also possible to actively add Si as an arbitrary component, but there are also cases where Si is not actively added but is contained as inevitable impurities. Si is contained as inevitable impurities not only in ingots having an ordinary purity but also in high-purity ingots having a purity of Al of 99.9% or higher, and, in the case of being contained as inevitable impurities as described above, when the content thereof is 0.100 mass % or less, effects of the present disclosure are not impaired. In a case where Si is actively added as an arbitrary component, the content of Si in the aluminum alloy is preferably 14.00 mass % or less from the viewpoint of further improving the stiffness and strength of the aluminum alloy disc blank.

Flatness Change of Aluminum Alloy Disc Blank

The flatness change when the aluminum alloy disc blank according to the present disclosure is held in the atmosphere at 50° C. or lower for 336 hours (the absolute value of the difference between the flatness before holding and the flatness after holding) is set to 2.0 μm or less. When the flatness change is made to be as small as 2.0 μm or less, it is possible to reduce a protruding defect to improve the smoothness of the surface. In the aluminum alloy disc blank where this flatness change exceeds 2.0 μm, residual stress is likely to be generated during surface cutting or grinding, the residual stress does not completely disappear even during annealing that is performed after the processing, when sputtering has been performed, the residual stress is released, a protruding defect is generated, and the smoothness deteriorates. Therefore, the flatness change of the aluminum alloy disc blank according to the present disclosure when held in the atmosphere at 50° C. or lower for 336 hours is 2.0 μm or less. The flatness change of the aluminum alloy disc blank is preferably 1.0 μm or less, more preferably 0.9 μm or less and still more preferably 0.8 μm or less.

The flatness in the present disclosure is represented by a difference between the maximum crest height and the maximum trough depth of the entire surface of the aluminum alloy disc blank. Here, the maximum crest height is the difference between the average line of the contour line in the measurement range and the highest value in the measurement range, and the maximum trough depth is the difference between the average line and the lowest value in the measurement range. Here, FIG. 1 is a diagram showing the measurement range of the flatness of an aluminum alloy disc blank 2. As shown in FIG. 1, when the radius from a center 1 of the aluminum alloy disc blank 2 to the inner diameter of the aluminum alloy disc blank 2 is represented by Rx (mm), and the radius from the center 1 of the aluminum alloy disc blank 2 to the outer diameter of the aluminum alloy disc blank 2 is represented by Ry (mm), a region surrounded by a circle of Rx+1 (mm) and a circle of Ry−1 (mm) becomes the measurement range. As the aluminum alloy disc blank that is used in the measurement of the flatness, each aluminum alloy disc blank that has been peeled off after press annealing and then stored at 0° C. to 50° C. for one hour or shorter is used. It has been confirmed from a preliminary test that, when a disc blank is peeled off after press annealing and then stored at 0° C. to 50° C. for one hour or shorter, the flatness change when the same aluminum alloy disc blank is held at 50° C. or lower for 336 hours shows the same value without being affected by the temperature.

Crystal Grain Diameters

The crystal grain diameters on the surface of the aluminum alloy disc blank according to the present disclosure are preferably 18 μm or less, more preferably 15 μm or less, still more preferably 12 μm or less, particularly preferably 11 μm or less and more particularly preferably 10 μm or less. When the crystal grain diameters are made to be as small as described above, it is possible to reduce a protruding defect. More specifically, in the aluminum alloy disc blank having as small crystal grain diameters as described above, crystal grain boundaries increase, whereby the deformation resistance becomes large, and thus it is possible to inhibit the flatness change. As a result, residual stress is less likely to be generated during surface cutting or grinding, the residual stress effectively disappears even during annealing that is performed after the processing, when sputtering has been performed, a protruding defect is less likely to be generated, and the smoothness improves. Therefore, the crystal grain diameters are preferably 18 μm or less, more preferably 15 μm or less, still more preferably 12 μm or less, particularly preferably 11 μm or less and more particularly preferably 10 μm or less.

A-2. Method for Manufacturing Aluminum Alloy Sheet (1) Casting Step

A raw material of an aluminum material having a predetermined alloy composition is melted, molten metal is produced, and then this is cast, thereby producing an ingot. As the casting, a semi-continuous casting (DC casting) method, a mold casting method or a continuous casting (CC casting) method is used. In the DC casting method, the molten metal poured through a spout is robbed of heat with a bottom block, the wall of a mold cooled with water, and cooling water that is directly discharged to the outer periphery of an ingot, solidified and drawn downward as an ingot. In the mold casting method, the molten metal poured into a hollow mold made of cast iron or the like is robbed of heat into the wall of the mold and solidified, whereby an ingot is completed. In the CC casting method, the molten metal is supplied to a portion between a pair of rolls (or belt casters, block casters) through a casting nozzle, and a thin sheet is directly cast by removing heat from the rolls.

In such a casting step, it is preferably to perform inline a degassing treatment for reducing dissolved gas in the molten metal and a filtration treatment for removing a solid matter from the molten metal.

As the degassing treatment, it is possible to adopt, for example, a treatment method that is called an SNIF (spinning nozzle inert flotation) process, a treatment method that is called an Alpur process or the like. In these processes, a process gas such as argon gas or a gas mixture of argon and chlorine is blown while the molten metal is stirred at a high speed with a blade-attached rotary body, and fine bubbles of the process gas are formed in the molten metal. This makes it possible to remove hydrogen gas or an inclusion dissolved in the molten metal within a short period of time. In the degassing treatment, it is possible to use an inline-type degassing device.

As the filtration treatment, it is possible to adopt, for example, a cake filtration-type treatment, a filter medium filtration-type treatment or the like. In addition, in the filtration treatment, it is possible to use, for example, filters such as a ceramic tube filter, a ceramic foam filter and an alumina ball filter.

(2) Homogenization Treatment Step

Until hot rolling is performed after the ingot is produced, a homogenization treatment may be performed by performing the facing of the ingot as necessary. It is possible to set the holding temperature in the homogenization treatment as appropriate in, for example, a range of 500° C. to 570° C. In addition, it is possible to set the holding time in the homogenization treatment as appropriate in, for example, a range of one to 60 hours.

(3) Hot Rolling Step

Thereafter, hot rolling is performed on the ingot, thereby producing a hot rolled sheet. The rolling conditions of the hot rolling are not particularly limited, and it is possible to perform the hot rolling by, for example, setting the start temperature in a range of 400° C. to 550° C. and the end temperature in a range of 260° C. to 380° C.

(4) Cold Rolling Step

After the hot rolling is performed, it is possible to obtain a cold rolled sheet by performing one pass or more of cold rolling on the obtained hot rolled sheet. As the total rolling reduction of the cold rolling increases, the crystal grain diameters become smaller, and thus the total rolling reduction of the cold rolling is preferably set to 70% or more and more preferably set to 80% or more. The upper limit is not particularly provided to the total rolling reduction of the cold rolling; however, when the total rolling reduction is too high, the cold rolling time becomes long, and the cost increases, and thus the upper limit is set to approximately 95%. In addition, it is possible to set the thickness of the cold rolled sheet as appropriate in, for example, a range of 0.2 to 1.9 mm.

(5) Annealing Step

In the manufacturing method of the above-described aspect, an annealing treatment may be performed as necessary at least one of before the first pass and between passes in the cold rolling. The annealing treatment may be performed using a batch-type heat treatment furnace or may be performed using a continuous heat treatment furnace. In the case of using the batch-type heat treatment furnace, it is preferable to set the holding temperature during annealing to 250° C. to 430° C. and the holding time in a range of 0.1 to 10 hours. In addition, in the case of using the continuous heat treatment furnace, it is preferable to set the retention time in the furnace to 60 seconds or shorter and the temperature in the furnace to 400° C. to 500° C. When the annealing treatment is performed under such conditions, it is possible to recover the processability during the cold rolling.

The aluminum alloy sheet is produced by the above-described steps.

A-3. Method for Manufacturing Aluminum Alloy Substrate

Blanking is performed on the above-described aluminum alloy sheet, thereby producing an aluminum alloy disc blank having an annular shape. After that, the aluminum alloy disc blank is heated while being pressed from both sides in the thickness direction to perform press annealing, whereby strain in the aluminum alloy disc blank is reduced, and the flatness is improved. The holding temperature and pressure in the press annealing can be selected as appropriate from, for example, 250° C. to 430° C. and a range of 1.0 to 3.0 MPa. In addition, the holding time in the press annealing can be set to, for example, 30 minutes or longer.

After the press annealing is performed, it is preferable that each aluminum alloy disc blank is peeled off and then stored in the atmosphere in a temperature range of −10° C. or lower. When disc blank is stored at −10° C. or lower before cutting and grinding, it is possible to inhibit the flatness change of the disc blank. When the flatness change is made to be small as described above, it is possible to reduce a protruding defect in the aluminum alloy disc blank to improve the smoothness of the surface. In the aluminum alloy disc blank where this flatness change is larger than 2.0 μm, residual stress is likely to be generated during surface cutting or grinding, the residual stress does not completely disappear even during annealing that is performed after the processing, when sputtering has been performed, the residual stress is released, a protruding defect is generated, and the smoothness deteriorates. Therefore, after the press annealing is performed, the aluminum alloy disc blank is peeled off and then preferably stored in the atmosphere in a temperature range of −10° C. or lower, more preferably stored at −20° C. or lower and still more preferably stored at −25° C. or lower. The lower limit of the storage temperature is not particularly provided; however, when the temperature is too low, the cost increases, and thus the storage temperature is preferably −40° C. or higher, more preferably −38° C. or higher and still more preferably −35° C. or higher. The above-described storage step is different from the storage of the aluminum alloy disc blank at 0° C. to 50° C. for one hour or shorter that is performed at the time of measuring the flatness.

Thereafter, cutting and grinding are sequentially performed on the aluminum alloy disc blank, whereby an aluminum alloy substrate having a desired shape is produced. After these procedures are performed, a strain relief heat treatment for removing strain during the processing is performed under conditions of at 150° C. to 350° C. for 0.1 to 10.0 hours.

The aluminum alloy substrate is produced by the above-described steps.

B. Magnetic Disc

B-1. Configuration of Magnetic Disc

A magnetic disc including the aluminum alloy substrate has, for example, the following configuration. That is, the magnetic disc includes the aluminum alloy substrate made of the aluminum alloy disc blank, a Ni—P plated layer that covers the surface of this aluminum alloy substrate and a magnetic body layer stacked on this Ni—P plated layer. The Ni—P plated layer is preferably an electroless Ni—P plated layer formed by electroless plating.

The magnetic disc may further include a protective layer made of a carbon-based material such as diamond-like carbon and stacked on the magnetic body layer, and a lubricating layer made of a lubricant and applied on the protective layer.

B-2. Method for Manufacturing Magnetic Disc

Upon manufacturing the magnetic disc from the aluminum alloy substrate, it is possible to adopt, for example, the following method. First, degreasing cleaning is performed on the aluminum alloy substrate to remove an oil component such as processing oil attached to the surface of the aluminum alloy substrate. After the degreasing cleaning, etching may be performed on the aluminum alloy substrate using an acid as necessary. In a case where etching has been performed, it is preferable to perform a desmutting treatment for removing smut generated by the etching from the aluminum alloy substrate after the etching. Treatment conditions in these treatments can be set as appropriate depending on the kind of a treatment liquid.

After these plating pretreatments are performed, a zincate treatment for forming a Zn coating on the surface of the aluminum alloy substrate is performed. In the zincate treatment, it is possible to form a Zn coating by performing zinc immersion plating by which Al is substituted by Zn. As the zincate treatment, it is preferable to adopt a so-called double zincate method in which, after first zinc immersion plating is performed, a Zn coating formed on the surface of the aluminum alloy substrate is once peeled off and zinc immersion plating is performed again to form a Zn coating. According to the double zincate method, compared with a Zn coating that is formed by first zinc immersion plating alone, it is possible to form a denser Zn coating on the surface of the aluminum alloy substrate. As a result, it is possible to reduce a defect of the Ni—P plated layer in the electroless Ni—P plating that is a post step.

After the Zn coating is formed on the surface of the aluminum alloy substrate by the zincate treatment, it is possible to substitute the Zn coating by a Ni—P plated layer by performing electroless Ni—P plating. In addition, it is possible to form a smooth Ni—P plated layer having a small number of plating pits by substituting such a Zn coating by a Ni—P plated layer in the electroless Ni—P plating.

When the thickness of the Ni—P plated layer is made to be thick, there is a tendency that the number of plating pits becomes small, and it is possible to form a smooth Ni—P plated layer. Therefore, the thickness of the Ni—P plated layer is preferably 7 μm or more, more preferably 18 μm or more and still more preferably 25 μm or more. Practically, the upper limit value of the thickness of the Ni—P plated layer is approximately 40 μm.

It is possible to further enhance the smoothness of the surface of the Ni—P plated layer by polishing the Ni—P plated layer after the electroless Ni—P plating.

After the electroless Ni—P plating (also including the polishing treatment), a magnetic body is attached onto the Ni—P plated layer by sputtering to form a magnetic body layer. The magnetic body layer may be formed of a single layer or may be formed of a plurality of layers having different compositions from each other. After the sputtering is performed, a protective layer made of a carbon-based material is formed on the magnetic body layer by CVD as necessary. Next, a lubricant is applied onto the protective layer to form a lubricating layer. It is possible to obtain the magnetic disc as described above.

Examples

Examples of an aluminum alloy sheet, a method for manufacturing the same and an aluminum alloy disc blank produced from this aluminum alloy sheet will be described. A specific aspect of the aluminum alloy sheet, the method for manufacturing the same, the aluminum alloy disc blank and the method for manufacturing the same according to the present disclosure is not limited to an aspect of the examples to be described below, and it is possible to modify the configuration as appropriate from the examples to an extent that the gist of the present disclosure is not impaired.

(1) Production of Aluminum Alloy Sheet

An aluminum alloy sheet that was used for evaluation in each example was produced by the following method. First, molten metal having chemical components shown in Table 1 was prepared in a melting furnace.

TABLE 1

| | Alloy No. | Alloy composition (mass %) | | | | | | | | | | | | | |
|---|---|---|---|---|---|---|---|---|---|---|---|---|---|---|---|
| | | Si | Fe | Cu | Mn | Mg | Cr | Zn | Zr | Be | Ni | Sr | Na | P | Al + Inevitable impurity |
| Example 1 | A1 | 0.02 | 0.020 | 0.02 | 0.00 | 4.0 | 0.05 | 0.31 | 0.00 | 0.0010 | 0.00 | 0.00 | 0.00 | 0.00 | Balance |
| Example 2 | A2 | 0.02 | 0.020 | 0.02 | 0.00 | 4.0 | 0.05 | 0.31 | 0.00 | 0.0010 | 0.00 | 0.00 | 0.00 | 0.00 | Balance |
| Example 3 | A3 | 0.02 | 0.020 | 0.02 | 0.00 | 4.0 | 0.05 | 0.31 | 0.00 | 0.0010 | 0.00 | 0.00 | 0.00 | 0.00 | Balance |
| Example 4 | A4 | 0.06 | 0.692 | 0.24 | 0.29 | 1.6 | 0.16 | 0.01 | 0.00 | 0.0006 | 1.83 | 0.00 | 0.00 | 0.00 | Balance |
| Example 5 | A5 | 0.06 | 0.687 | 0.02 | 0.91 | 0.0 | 0.00 | 0.33 | 0.00 | 0.0000 | 1.67 | 0.00 | 0.00 | 0.00 | Balance |
| Example 6 | A6 | 12.67 | 0.284 | 0.03 | 0.00 | 0.1 | 0.00 | 0.38 | 0.00 | 0.0000 | 5.54 | 0.02 | 0.00 | 0.00 | Balance |
| Example 7 | A7 | 0.06 | 1.402 | 0.01 | 0.34 | 0.0 | 0.00 | 0.32 | 0.00 | 0.0000 | 0.00 | 0.00 | 0.00 | 0.00 | Balance |
| Example 8 | A8 | 0.06 | 0.502 | 0.02 | 0.34 | 0.0 | 0.00 | 0.35 | 0.00 | 0.0000 | 0.00 | 0.00 | 0.00 | 0.00 | Balance |
| Example 9 | A9 | 0.06 | 1.420 | 0.02 | 0.34 | 0.0 | 0.00 | 0.34 | 0.05 | 0.0000 | 0.01 | 0.00 | 0.00 | 0.00 | Balance |
| Example 10 | A10 | 0.06 | 1.402 | 0.01 | 0.34 | 0.0 | 0.00 | 0.32 | 0.00 | 0.0000 | 0.00 | 0.00 | 0.00 | 0.00 | Balance |
| Example 11 | A11 | 0.07 | 0.265 | 0.02 | 1.00 | 2.5 | 0.00 | 0.32 | 0.00 | 0.0003 | 0.00 | 0.00 | 0.00 | 0.00 | Balance |
| Example 12 | A12 | 0.05 | 0.192 | 0.02 | 1.01 | 2.5 | 0.00 | 0.32 | 0.00 | 0.0003 | 0.00 | 0.00 | 0.00 | 0.00 | Balance |
| Comparative Example 1 | B1 | 0.06 | 1.402 | 0.01 | 0.34 | 0.0 | 0.00 | 0.32 | 0.00 | 0.0000 | 0.00 | 0.00 | 0.00 | 0.00 | Balance |
| Comparative Example 2 | B2 | 0.06 | 1.402 | 0.01 | 0.34 | 0.0 | 0.00 | 0.32 | 0.00 | 0.0000 | 0.00 | 0.00 | 0.00 | 0.00 | Balance |
| Comparative Example 3 | B3 | 0.00 | 0.002 | 0.00 | 0.00 | 0.0 | 0.00 | 0.00 | 0.00 | 0.0000 | 0.00 | 0.00 | 0.00 | 0.00 | Balance |
| Comparative Example 4 | B4 | 0.06 | 8.000 | 0.02 | 0.00 | 0.0 | 0.00 | 0.33 | 0.00 | 0.0000 | 0.00 | 0.00 | 0.00 | 0.00 | Balance |

Thereafter, the molten metal in the melting furnace was transferred, and an ingot was produced by a casting method shown in Table 2.

TABLE 2

| | Alloy No. | Casting method | Homogenization treatment temperature (° C.) | Homogenization treatment time (h) | Hot rolling start temperature (° C.) | Hot rolling end temperature (° C.) | Sheet thickness after hot rolling (mm) | Total rolling reduction of cold rolling (%) | Press annealing temperature (° C.) |
|---|---|---|---|---|---|---|---|---|---|
| Example 1 | A1 | DC casting | 550 | 4 | 450 | 350 | 3.8 | 53 | 320 |
| Example 2 | A2 | DC casting | 550 | 4 | 450 | 350 | 3 | 70 | 320 |
| Example 3 | A3 | DC casting | 550 | 4 | 450 | 350 | 3 | 78 | 320 |
| Example 4 | A4 | Mold casting | 520 | 7 | 520 | 280 | 3 | 75 | 320 |
| Example 5 | A5 | Mold casting | 520 | 7 | 520 | 260 | 4 | 85 | 320 |
| Example 6 | A6 | Mold casting | 500 | 4 | 500 | 280 | 3 | 75 | 320 |
| Example 7 | A7 | DC casting | 320 | 5 | 320 | 260 | 5 | 88 | 300 |
| Example 8 | A8 | DC casting | 320 | 5 | 320 | 270 | 5 | 88 | 300 |
| Example 9 | A9 | DC casting | 320 | 5 | 320 | 270 | 5 | 88 | 300 |
| Example 10 | A10 | DC casting | 320 | 5 | 320 | 250 | 5 | 88 | 250 |
| Example 11 | A11 | DC casting | 540 | 4 | 540 | 280 | 3 | 75 | 320 |
| Example 12 | A12 | DC casting | 540 | 4 | 540 | 280 | 3 | 75 | 320 |
| Comparative Example 1 | B1 | DC casting | 320 | 5 | 320 | 250 | 5 | 88 | 250 |

TABLE 2-continued

| | | | | | | | | |
|---|---|---|---|---|---|---|---|---|
| Comparative Example 2 | B2 | DC casting | 320 | 5 | 320 | 250 | 5 | 88 | 250 |
| Comparative Example 3 | B3 | Mold casting | 540 | 4 | 540 | 280 | 3 | 75 | 320 |
| Comparative Example 4 | B4 | Mold casting | 550 | 2 | 550 | — | — | — | — |

| | Holding temperature of aluminum alloy disc blank (° C.) | Holding time of aluminum alloy disc blank (h) | Flatness change (μm) | Evaluation of flatness change | Crystal grain diameter (μm) |
|---|---|---|---|---|---|
| Example 1 | −27 | 336 | 1.13 | A | 20.0 |
| Example 2 | −27 | 336 | 0.82 | A | 15.9 |
| Example 3 | −27 | 336 | 0.80 | A | 14.1 |
| Example 4 | −27 | 336 | 0.27 | A | 3.4 |
| Example 5 | −27 | 336 | 0.14 | A | 1.4 |
| Example 6 | −27 | 336 | 0.19 | A | 2.2 |
| Example 7 | −27 | 336 | 0.28 | A | 1.3 |
| Example 8 | −27 | 336 | 0.14 | A | 1.7 |
| Example 9 | −27 | 336 | 0.27 | A | 1.3 |
| Example 10 | −27 | 336 | 0.15 | A | 1.2 |
| Example 11 | −27 | 336 | 0.34 | A | 10.3 |
| Example 12 | −27 | 336 | 0.61 | A | 11.0 |
| Comparative Example 1 | 25 | 336 | 3.22 | D | 1.2 |
| Comparative Example 2 | 25 | 336 | 4.39 | D | 1.2 |
| Comparative Example 3 | — | — | — | — | — |
| Comparative Example 4 | — | — | — | — | — |

Next, the surface of the ingot was faced, and a segregation layer present on the ingot surface was removed. A homogenization treatment was performed by performing a heating treatment on the ingot on which the facing had been performed under conditions shown in Table 2. Next, hot rolling was performed under conditions shown in Table 2 to obtain a hot rolled sheet. Furthermore, cold rolling was performed under conditions shown in Table 2 to obtain an aluminum alloy sheet.

(2) Production of Aluminum Alloy Disc Blank

Blanking was performed on the aluminum alloy sheet, thereby obtaining an aluminum alloy disc blank having an annular shape with an outer diameter of 98 mm and an inner diameter of 24 mm. Here, next, the obtained aluminum alloy disc blank was held at a temperature shown in Table 2 for three hours while being pressed from both sides in the thickness direction to perform press annealing. After that, the aluminum alloy disc blank was stored under conditions shown in Table 2. A test material of the aluminum alloy disc blank of each example was produced as described above.

Evaluation methods in each test material will be described below. Since the Fe amount was small and the strength was too low, B3 was likely to deform during peeling after press annealing and could not be used as an aluminum alloy disc blank, and thus evaluation was not performed. In addition, since the Fe amount was large and the strength was too high in B4, crack occurred during rolling and could not be used as an aluminum alloy disc blank, and thus evaluation was not performed.

Method for Measuring Crystal Grain Diameters

First, regarding crystal grain diameters, sputtering was performed on a rolled surface of the test material of the aluminum alloy disc blank for structure observation using glow discharge spectrometer (Glow Discharge Spectrometer: GDS, JY5000RF, manufactured by Horiba Ltd.) at a gas pressure of 400 Pa and an output set to 30 W for 60 s. Orientation information of the texture was measured on the sputtered surface with an electron backscatter diffraction (SEM-EBSD) attached to a scanning electron microscope and thereby acquired. A measurement region of the sample was set to 1000 μm×1000 μm, and, regarding measurement step intervals, in a case where the crystal grain diameters were 12 μm or more, the step intervals were set to 3 μm, in a case where the crystal grain diameters were 8 μm or more and less than 12 μm, the step intervals were set to 2 μm, and, in a case where the crystal grain diameters were less than 8 μm, the step intervals were set to approximately ¼.

The crystal grain diameters were measured from obtained orientation data using EBSD analysis software ("OIM Analysis" manufactured by TSL Solutions). At this time, crystal boundaries having a misorientation of 5° or more were regarded as crystal grain boundaries, and diameters calculated from equivalent circles were regarded as the crystal grain diameters.

Investigation of Flatness Change

First, regarding the aluminum alloy disc blank that had been subjected to press annealing as described above and stored in some cases, flatness was measured within one hour from peeling. After that, the aluminum alloy disc blank was placed flat on a surface plate or the like and left to stand at a temperature for a time shown in Table 2, the flatness was measured again, and the absolute value of {(flatness before being left to stand at 50° C. or lower for 336 hour)−(flatness after being left to stand at 50° C. or lower for 336 hour)}, which is a difference in the flatness before and after being left to stand was calculated as a flatness change. The definition of the flatness is as described above. In addition, the flatness was measured with a flatness measuring instrument (MESA) manufactured by ZyGO Corporation. In a case where the flatness change was 2 μm or less, the fluttering property was evaluated as A (excellent), and, in a case where the flatness change exceeded 2 μm, the fluttering property was evaluated as D (poor). The results are shown in Table 2. A reference sign "-" in Table 2 indicates that no treatment or evaluation is performed.

As shown in Table 1 and Table 2, test materials A1 to A12 had the chemical component composition of the present disclosure, and the flatness changes of the disc blanks when the disc blanks have been held in the atmosphere at 50° C. or lower for 336 hours were 2.0 μm or less. Therefore, these test materials were capable of enhancing the smoothness of the surface.

Regarding test materials B1 and B2, the flatness change of the disc blanks when the disc blanks had been held in the atmosphere at 50° C. or lower for 336 hours exceeded 2.0 μm. Therefore, a protruding defect was likely to be generated, and the smoothness deteriorated.

The invention claimed is:

1. An aluminum alloy disc blank for a magnetic disc made of an aluminum alloy comprising Fe: 0.005 to 1.800 mass %, Mn: 1.80 mass % or less, Cu: 1.00 mass % or less, Si: 14.00 mass % or less, Zn: 0.70 mass % or less, wherein Mn, Cu, Si, and Zn are present, with a balance being Al and inevitable impurities, and wherein the aluminum alloy disc blank for a magnetic disc has a flatness change when the aluminum alloy disc blank for a magnetic disc is held in the atmosphere at 50° C. or lower for 336 hours is 2.0 μm or less.

2. The aluminum alloy disc blank for a magnetic disc according to claim 1, wherein the aluminum alloy further comprises one or more elements selected from the group consisting of Ni: 2.50 mass % or less, Mg: 4.50 mass % or less, Cr: 0.30 mass % or less, Zr: 0.15 mass % or less, Be: 0.0015 mass % or less, Sr: 0.10 mass % or less, Na: 0.10 mass % or less, and P: 0.10 mass % or less.

3. The aluminum alloy disc blank for a magnetic disc according to claim 1, wherein the aluminum alloy disc blank for a magnetic disc has a crystal grain diameter on a surface thereof that is 18 μm or less.

4. The aluminum alloy disc blank for a magnetic disc according to claim 1, wherein the aluminum alloy disc blank for a magnetic disc has a crystal grain diameter on a surface thereof that is 15 μm or less.

5. The aluminum alloy disc blank for a magnetic disc according to claim 1, wherein the aluminum alloy disc blank for a magnetic disc has a crystal grain diameter on a surface thereof that is 12 μm or less.

6. The aluminum alloy disc blank for a magnetic disc according to claim 1, wherein the aluminum alloy disc blank for a magnetic disc has a crystal grain diameter on a surface thereof that is 11 μm or less.

7. The aluminum alloy disc blank for a magnetic disc according to claim 1, wherein the aluminum alloy disc blank for a magnetic disc has a crystal grain diameter on a surface thereof that is 10 μm or less.

8. A magnetic disc, comprising: on a surface of an aluminum alloy substrate made of the aluminum alloy disc blank for a magnetic disc according to claim 1, a Ni—P plated layer; and a magnetic body layer on the Ni—P plated layer.

* * * * *